United States Patent [19]  [11] 4,323,091
Nolte et al.  [45] Apr. 6, 1982

[54] PAN WASH ENERGY

[75] Inventors: Robert K. Nolte, Chatham; Robert E. Rath, Morristown; Michael F. Jarvis, Berkeley Heights, all of N.J.

[73] Assignee: Metalwash Machinery Corp., Elizabeth, N.J.

[21] Appl. No.: 153,513

[22] Filed: May 27, 1980

[51] Int. Cl.$^3$ ............................................. B08B 3/02
[52] U.S. Cl. ...................................... 134/60; 134/72; 134/107
[58] Field of Search .................. 134/60, 68, 70, 72, 134/105, 107–108, 131

[56] References Cited

U.S. PATENT DOCUMENTS

| 1,029,541 | 6/1912 | Haustetter | 134/60 |
| 3,103,936 | 9/1963 | Nolte | 134/72 |
| 3,104,669 | 9/1963 | Claywell | 123/108 X |
| 3,367,044 | 2/1968 | Fitch | 134/72 X |
| 3,598,131 | 8/1971 | Weihe, Jr. | 134/107 |
| 3,660,910 | 5/1972 | Evans et al. | 134/72 X |
| 4,073,663 | 2/1978 | Lundgren | 134/60 X |
| 4,076,554 | 2/1978 | Weihe | 134/60 X |
| 4,089,339 | 5/1978 | Boynton | 134/107 X |
| 4,092,991 | 6/1978 | Rohrs | 134/131 X |

FOREIGN PATENT DOCUMENTS

| 270124 | 7/1968 | Austria | 134/72 |
| 1386199 | 12/1964 | France | 134/60 |

Primary Examiner—Robert L. Bleutge
Attorney, Agent, or Firm—Nolte and Nolte

[57] ABSTRACT

Apparatus for washing baking pans or the like comprises a pair of side-by-side hot washing solution tanks with a hot spray chamber mounted above each tank and with an endless belt conveyor which passes the articles successively through the spray chambers and from thence on to a dryer. A heat exchanger submerged in one of the tanks heats the water in that tank, some of which overvlows into the other tank. The same heat exchanger supplies hot air to both spray chambers by a flue riser outlet above the level of both tanks. Thus the heating equipment in one tank heats both tanks, and both spray chambers: thus saving the additional energy that would be required to separately heat such tank and each spray chamber.

6 Claims, 4 Drawing Figures

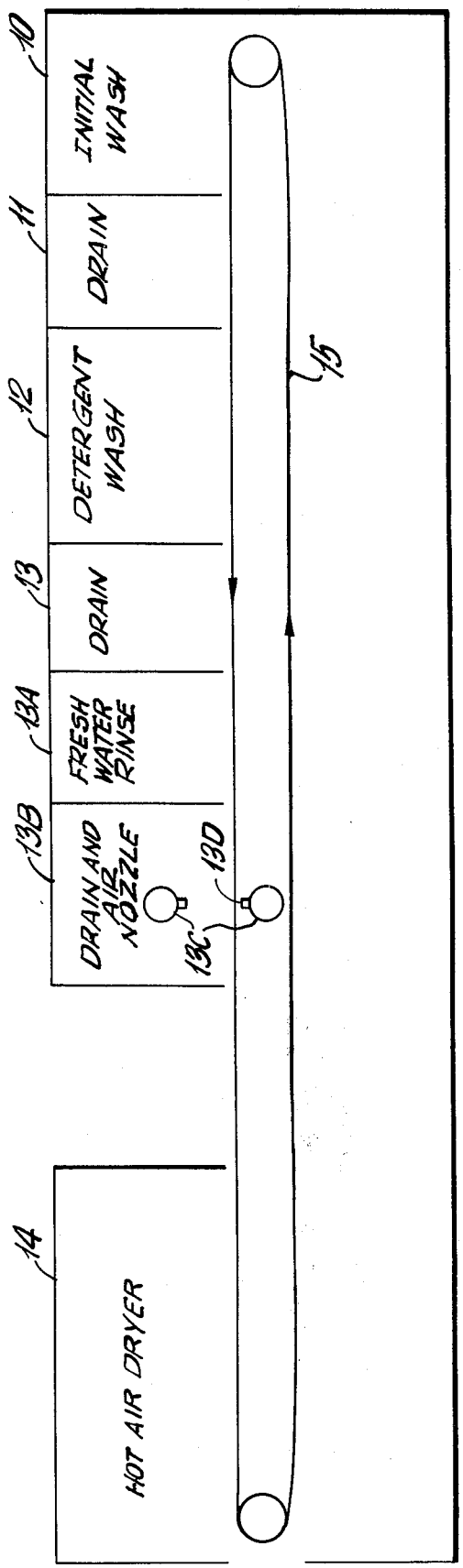
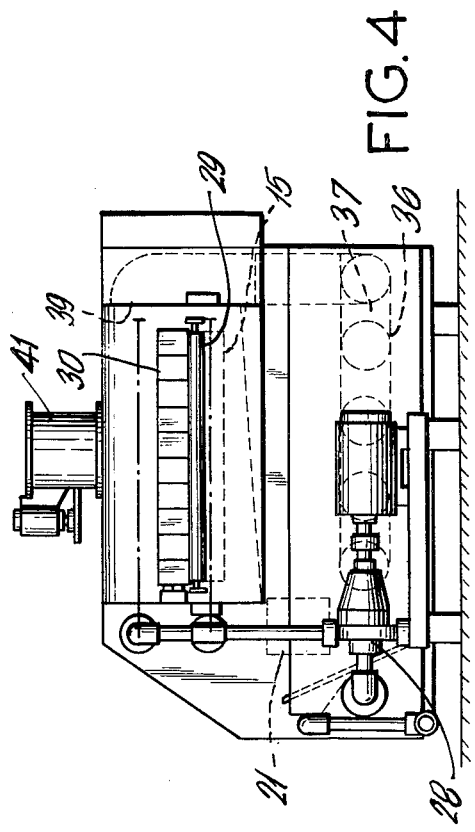
FIG.1
FIG.4

PAN WASH ENERGY

BACKGROUND OF THE INVENTION

1. Field of the Invention

The present invention relates to washing machines, and more particularly, to industrial spray washers comprising apparatus assemblies having a hot gas wash solution heater operating in combination with an endless belt horizontal conveyor which functions to move the items to be washed through the apparatus in a continuous and uninterrupted operation.

2. Description of the Prior Art

In U.S. Pat. No. 3,103,936 two side by side washers are disclosed. Each of these two washers has its own individual fire tube heat exchanger disposed within a washing solution tank. The fire tube traverses an S-shaped path or passage from its heating source through the washing solution so as to heat the liquid therein. It is subsequently ducted upwardly so as to effect a secondary heat transfer to a liquid spraying chamber area located above the level of the spray, prior to being vented as the products of combustion through a flue adjacent the spray area.

The prior art wash solution heater just described has in practice proven quite efficient, that is in doing the job for which is was designed, namely, for heating the solutions in each tank with a minimum of wasted thermal energy. Notwithstanding such efficiency, however, such heater has involved, as indicated above, at least two co-acting systems comprising two heat exchangers, and two burners or means for separately and independently heating each of the two exchangers: with one fire tube being required for each of the two solution reservoirs or tanks.

SUMMARY OF THE INVENTION

In the present invention, only one heat exchanger is required. That heat exchanger is preferably mounted on the second reservoir or tank, and it provides heat for the first tank as well as the second one. The single heat exchanger also heats both of the spray areas above the level of the two tanks.

Manifestly, the primary advantage of the invention is the conservation of energy and equipment obtained by employing only one heating system to heat both tanks: such that no additional equipment is needed to heat the first tank, although it will get hot-sufficiently hot to perform satisfactorily its assigned task.

Concomitant advantages flowing from the instant invention are the elimination of maintainence, adjustment, repairs and replacement costs with respect to the parts of the systems that are eliminated thereby.

With the above and other objects in view as will be apparent, the present invention consists in the construction, combination and arrangement of parts, all as hereinafter more fully described, claimed and illustrated in the accompanying drawings, wherein:

FIG. 1 is a schematic side view representation of an entire sequence for washing bakery pans or the like including in a continuous method of cleaning the same the steps of an initial hot wash, followed by a draining step, then a second hot detergent wash, then a second draining step, a final hot fresh-water rinse, followed by a drain step augmented by high-pressure air nozzles, and a final hot high-velocity air drying of the washed articles;

FIG. 4 is a load end elevation of the apparatus.

DESCRIPTION OF A PREFERRED EMBODIMENT

Figure 2:
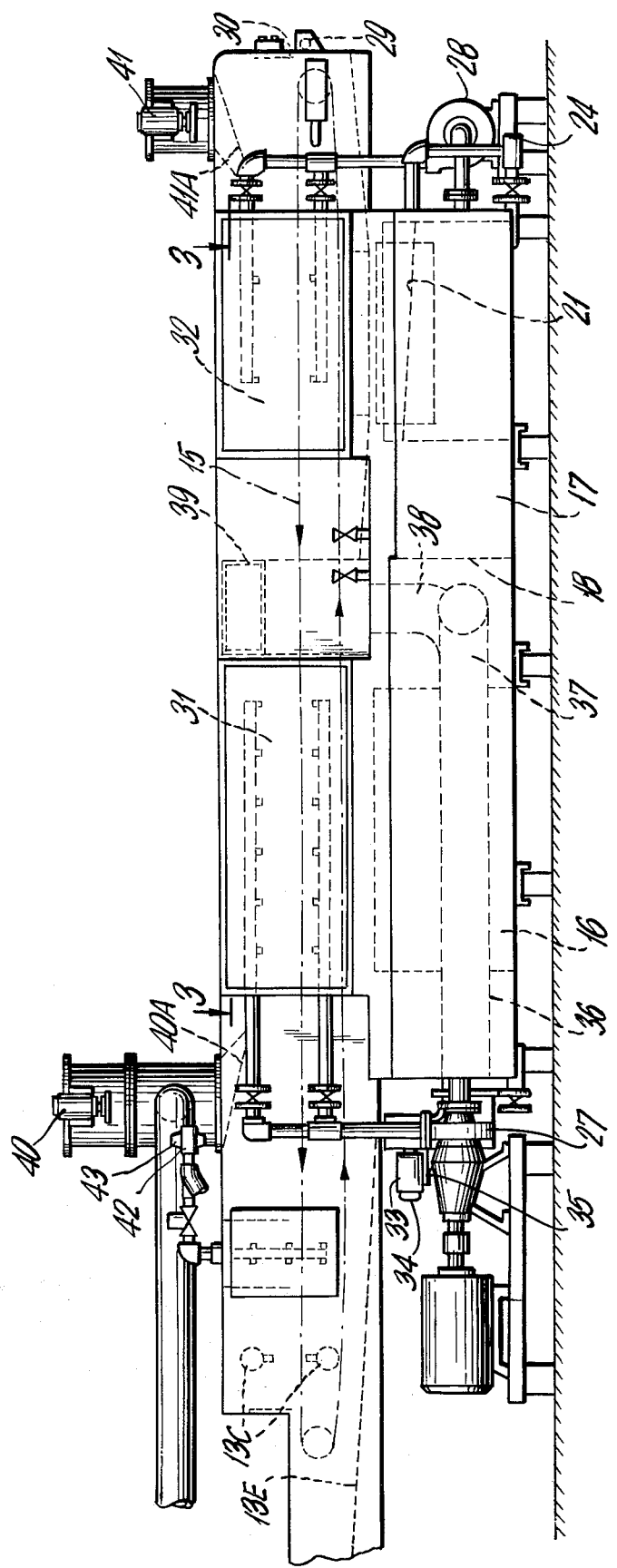
FIG. 2 is a side elevation, with part of the apparatus housing removed for clarity, of the entrance end, initial wash, drain, detergent wash, rinse, and air nozzle portions of the sequence of FIG. 1, constructed according to the invention.

A preferred embodiment of the present invention is schematically represented in FIG. 1 of the drawings hereof. As there seen the general arrangement or method of handling the articles to be washed on a continuous basis may include a plurality of separate and distinct treating zones. These may comprise as the first step in the cleaning operation an area 10 for subjecting the articles to be cleaned to an initial washing followed by draining in the drain zone 11 and a second washing as with a detergent composition in the detergent washing zone 12. After that the articles being cleaned are subjected to another draining in the drain area 13, and then rinsed with hot fresh water in area 13A. Following the rinse, the articles are drained in area 13B. To improve the draining procedure, a transverse air nozzle 13C is located above and below the articles to be cleaned, with the force of air issuing from said nozzles through the slot orifice 13D assisting in removing water droplets from the articles' surfaces. Finally, still in the continuous motion, the articles are subjected to a high velocity hot air dryer 14.

The articles being washed may be conveyed from the vestibule or entrance end of the apparatus at the initial zone 10 through and past the air drying zone 14 as by means of an endless belt arrangement 15 which conveys the articles being washed, drained and dried from one end of the treating apparatus to the other: with the articles being treated thereby moving progressively in the direction of the arrows seen at the beginning and end of the apparatus through the initial wash, drain, detergent wash, second drain, rinse, third drain, and drying and exit zones to complete the washing operation.

In FIG. 2 there is illustrated a side elevation of those parts of the continuous cleaning sequence of FIG. 1 which directly and immediately pertain to the preferred embodiments of the present invention: namely, two separate washing zones with a single heater/burner functioning to heat simultaneously both wash zones.

More particularly the invention includes preferably a plurality of reservoirs or tanks 16 and 17 disposed in side-by-side relationship, and sharing a common divider wall 18. It will be noted that the hot fresh rinse water from area 13A, after draining from the articles to be rinsed, flows by gravity down the pitched drain pan 13E into tank 16. The height of the common divider wall 18 is set such that a volume of solution from tank 16, equal to that added to tank 16 by the rinse water, is permitted to overflow wall 18 into tank 17. A similar volume of solution exits from tank 17 to the drain 24 by overflowing into the drain trough 21. In this fashion, the residual heat remaining in the rinse water is conserved by adding the same to tank 16. Also, additional heat is transferred from tank 16 to tank 17 by means of the solution overflowing wall 18.

A pressure reducing valve 43, at the hot fresh rinse water inlet connection 42, serves to maintain a constant and controlled rinse water flow and, through the aforesaid overflowing system, a constant overflow of solution from the rinse to tank 16, then to tank 17, and finally to the drain 24.

A pump 28 to one side of the base of tank 17 is constructed and arranged to circulate and recirculate the liquid in tank 17; whilst a like pumping device 27 circulates and recirculates the liquid contents of tank 16.

The articles to be cleaned are placed on a conveniently disposed loading roller 29 at the entrance end of the washing apparatus. From that point they are passed through a curtained opening 30 to the upper reach of the moving endless belt 15 which carries the articles being cleaned, in spaced relationship with respect to each other, through the entire washing sequence in a continuous and uninterrupted operation.

Above the two reservoirs 16, 17 there are suitably mounted a pair of rectangularly shaped spray chambers 31 and 32, respectively. As will be understood, the two liquid reservoirs 16 and 17 below and the corresponding spray chambers 31, 32 above them and spaced therefrom, are of a size and shape such as to accommodate readily the passage of the articles being cleaned through the sequence of washing apparatus on the moving endless belt 15.

Further in accordance with the present invention a combustion device such as an oil burner or gas burner 33, with a modulating temperature control or governor 34, is mounted on a base or support 35 adjacent the detergent wash pump 27 and communicates with the interior of the larger reservoir 16 so as to direct high temperature combustion gases through a substantially cylindrical heat exchanger conduit 36 which follows a serpentine-like path to conduct the hot combustion gases through an extended horizontal passageway 37 within the detergent solution tank 16 and thereafter through an extended riser portion 38. The riser exits through a suitable opening into the interior 39 confines of the washing apparatus at a point substantially between the two spray tank chambers and somewhat above the right-hand end portion of the reservoir 16.

The heat exchanger conduit 36 may take forms other than cylindrical and serpentine, provided that sufficient surface area is provided on the conduit to transfer heat to the solution in tank 16, and provided that the conduit terminates in the vertical riser portion 38 such that hot gases may reach the interior 39 confines.

Figure 3:
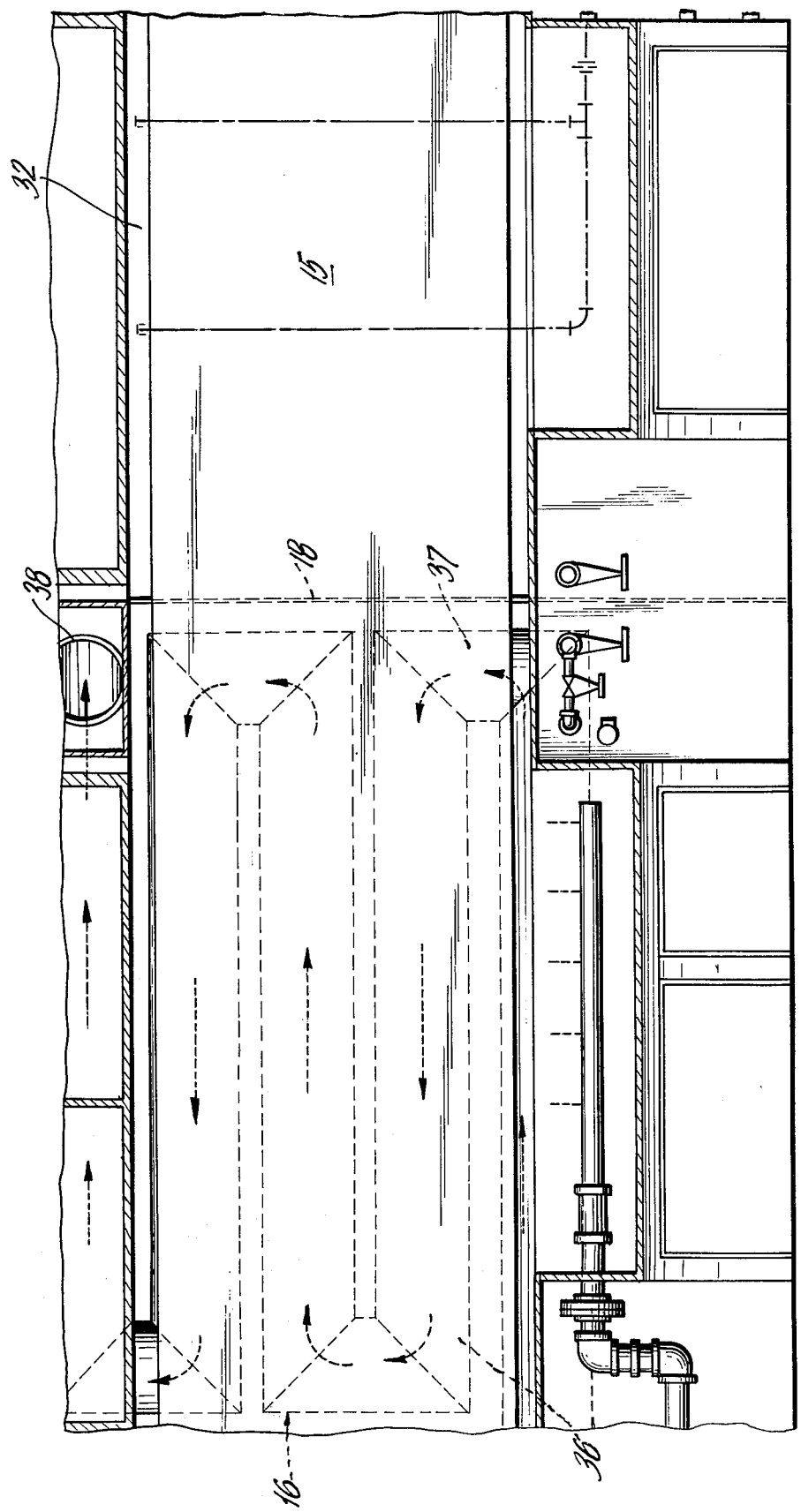
FIG. 3 is a horizontal section taken on the line 3—3 of FIG. 2 to show the direction of flow of the hot gases through the second of the two tanks.

FIG. 3 of the drawings indicates by directional arrows the serpentine passageway through which the hot combustion gases travel from the burner 33 just outside the left-hand wall of the reservoir 16, where they originate, from thence and from one side of the same reservoir 16 over to the opposite side thereof; and thereafter upwardly through the vertically disposed riser terminal portion 38 of the heating coil or other heat exchanger 36 to the interior 39 of the washing apparatus.

More particularly, as the hot flue gases emerge from the open end of the heat exchanger riser 38 they are free to diffuse both to the left and to the right into each of the two spray chambers 31, 32: that is to say, to the left and into the spray chamber 31 over the reservoir 16 which is the hot detergent tank; and to the right and into the spray chamber 32 over the reservoir 17 which is the initial wash tank.

The gases are thereafter drawn off by means of a pair of exhaust fans 40 and 41 mounted respectively to the left of the left-hand wall of the spray chamber 31 over the hot detergent reservoir tank 16; and to the right of the right-hand wall of the spray chamber 32 positioned above the reservoir of the initial wash tank 17. Dampers 40A and 41A are provided to regulate and proportion the flow of exhaust gases through spray chambers 31 and 32.

As will be apparent from the relationship described and illustrated herein, between the two tanks 16 and 17, the invention provides a practical and efficient heat transfer system to the solutions used for the washing of the articles being treated in the present apparatus. Commercially, the temperature specifications for the initial wash section 10 of the apparatus will be lower than those of the detergent wash area 12. Specifically, the detergent wash solution temperature may for example, be in the order of from about 140° F. to about 155° F., while the initial solution temperature may be allowed to reach its own equilibrium; preferably in the order of from about 120° F. to about 130° F. as measured from machine operation.

Therefore, to compare the relative efficiency of the prior art two burner unit of U.S. Pat. No. 3,103,936 above referred to with that of the present single burner apparatus, the initial wash section of the two burner device, with a heating coil in that section should be set for comparable temperatures of operation, namely, from about 120° F. to about 130° F.

In the one burner unit the second zone or wash tank has the coil heater with the exhaust gases circulating through the coil, the gases going both into the initial wash zone and through the wash zone. The overflow of solution from the wash tank into the initial wash tank also contributes to the heating of the initial wash section. In the two burner unit the gases also circulate through the sprays to assist in heating as called for in the said patent.

In the single burner unit, all of the heating from the submerged coil takes place in the hot wash tank of the second zone. Because of this, the higher temperature requirement in this tank, and the total heat demand of the machine being placed on this coil, greater efficiency of heat transfer will occur. In the two burner machine only the wash section burner would be operating at this comparable higher temperature and efficiency. In contrast, the initial wash burner would operate at a lower temperature with somewhat less efficiency due to the lower operating temperature. Therefore, it is believed proper to conclude that the single burner machine would be more efficient to the degree that the initial wash burner operating at the lower temperature in the dual burner machine is inefficient.

Thus, the single burner unit of the present invention provides a real and significant improvement in operating efficiency.

In operation the hot flue gases pass along the serpentine path constituted by the heating coil or heat exchanger 36, 37 that is submerged within the detergent washing solution reservoir 16. These gases exit therefrom by means of the vertical open end riser portion 38, 39 of the heating coil 36 and from thence into the interior 39 of the machine: specifically, into both of the spray 31, 32 chambers over the detergent wash tank 16 and also over the initial wash reservoir or tank 17: the tank 17 containing a suitable wash solution.

A second area of improved energy efficiency concerns the recovery of the hot fresh rinse water after it drains from the rinsed articles. The invention provides means for saving energy in that the same hot water may be used and re-used: first in tank 16 and then, by overflow from the divider wall 18, into the initial wash tank 17. Moreover, a further feature is the provision of a long-life detergent solution. That is to say, while the pans or other articles being cleaned pass through the first spray chamber 32 over the tank 17 practically all soil is removed from the pans. The initial wash tank 17 does not need to be charged with detergent, for it becomes alkaline by reason of the overflow of the detergent charged into the tank 16, and also from drippings from the conveyor belt 15 return.

Still further on the conservation of energy which the present invention features, it is to be noted that in operation no equipment is provided, and none is necessary, in order to heat the initial wash tank 17. However, that initial wash tank becomes relatively hot i.e., sufficiently heated to function satisfactorily as such by reason of the following factors. That is to say: the wash tank 17 receives the overflow of the hot detergent wash tank 16. It also receives the carry-back of hot detergent wash solution on the return side of the endless conveyor belt 15. And further still, the wash tank 17 receives heat from the common wall 18 which separates the wash tank 17 and the detergent wash tank 16; and additional heat from the water friction of the high pressure sprays employed in the water spray chambers 31 and 32.

Perhaps even more importantly, from the standpoint of conserving energy, it has been found that a substantial portion of the hot flue gases (which may be heated to approximately 900° F.) reaches to and penetrates the spray chamber 32 over the tank 17, and mixes there with its own sprays. This heat comes from the detergent wash section gas heat exhaust 38 flowing through the initial wash section of the interior 39 of the apparatus right up to the right-hand vent fan 41.

Moreover, the whole assembly is "buttoned-up", so to speak, in that room air entering the apparatus is minimized by the use of the curtains 30 over the opening at the entrance of the washer. This feature also reduces the heating and venting requirements of the machine while it is in operation.

In short, the present invention comprises a combination heat transfer and water transfer system featuring energy conservation by reason of (1) the overflow of treating solution from the tank 16 to the tank 17, (2) the carryback of hot water on the return of the endless belt conveyor 15, (3) the common wall divider 18 between the two tanks 16 and 17, (4) the water friction of the high pressure sprays in the two chambers 31 and 32, (5) the defusion of the hot combustion gases reaching spray chamber 32 over the hot tank 17 and, (6) the controlled temperature conditions afforded by the curtains 30 over the entrance to the washing apparatus range.

While a specific embodiment of this invention is here shown in the drawings and described in detail for the purpose of illustrating the application of the principles of the invention, it will be understood that the invention may also be embodied otherwise without departing from such principles or the scope thereof.

What is claimed is:

1. In an article washer having a pair of coacting reservoir tanks disposed in side-by-side relationship, means for filling said tanks with a liquid, a spray chamber disposed above each of said tanks, and means for conveying the articles to be washed successively through each of said spray chambers, means for passing high temperature gases through only one of said tanks to heat the liquid contents therein, means for transferring only a limited portion of said gas heated liquid contents to the other tank, means individual to each spray chamber for passing the heated liquid contents from its respective reservoir tank into its respective spray chamber, and means for routing said high-temperature gases from one tank upwardly from said reservoir tank to the spray chambers above both of said tanks, and means adjacent the second spray chamber and distant from the first spray chamber for venting at least a portion of said gases out of said washer.

2. A washer according to claim 1 further characterized in that said means for transfering liquid contents from one tank to the other tank comprises means for controlling the liquid in-flow and out-flow of each tank.

3. A washer according to claim 1 further characterized in that said heating means comprises a common wall separating each of said tanks from the other tank.

4. A washer according to claim 3 further characterized in that said means for transferring only a limited portion of said liquid contents from one tank to the other comprises means to enable the liquid contents of one tank to overflow over said common wall into the other tank.

5. A washer according to claim 4 further characterized in that each of said spray chambers is constructed and arranged to furnish heat generated by friction of high pressure sprays to that tank in which said heating means are not incorporated.

6. A washer according to claim 1 further characterized in that said means for passing high temperature gases through only one of said tanks to heat the liquid contents therein comprises a heat exchanger duct submerged therein and defining an elongated passage therethrough terminating with a riser outlet communicating with both of said spray chambers.

* * * * *